(No Model.) 2 Sheets—Sheet 1.
I. S. SANGER.
AUTOMATIC WEIGHING MECHANISM FOR ELEVATORS, &c.
No. 349,521. Patented Sept. 21, 1886.
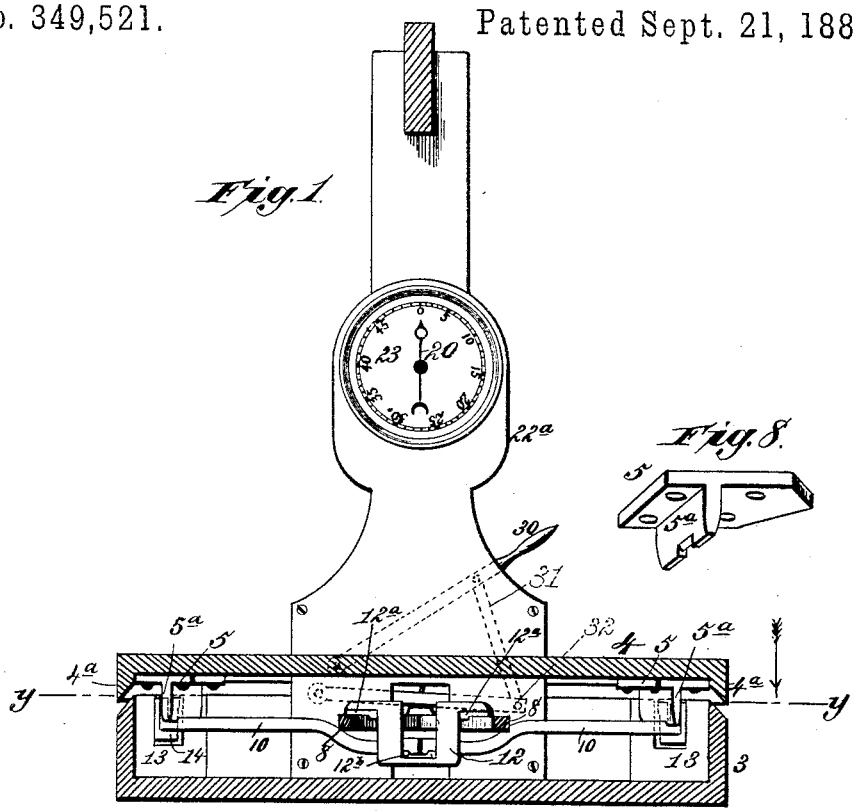
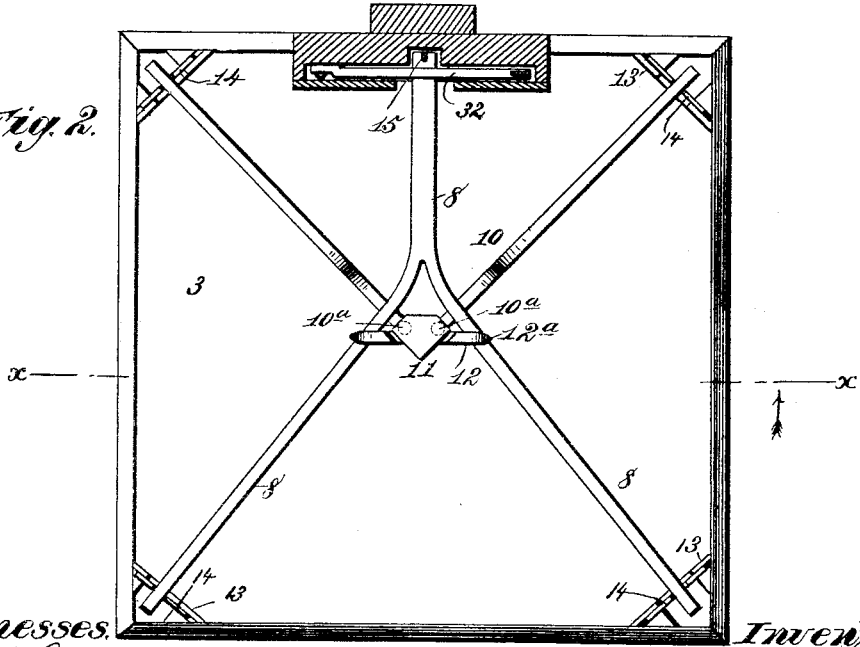
Witnesses.
Robert Pruitt,
J. A. Rutherford
Inventor.
Isaac S. Sanger.
By James L. Norris.
Atty.
N. PETERS, Photo-Lithographer, Washington, D. C.

(No Model.) 2 Sheets—Sheet 2.
I. S. SANGER.
AUTOMATIC WEIGHING MECHANISM FOR ELEVATORS, &c.
No. 349,521. Patented Sept. 21, 1886.
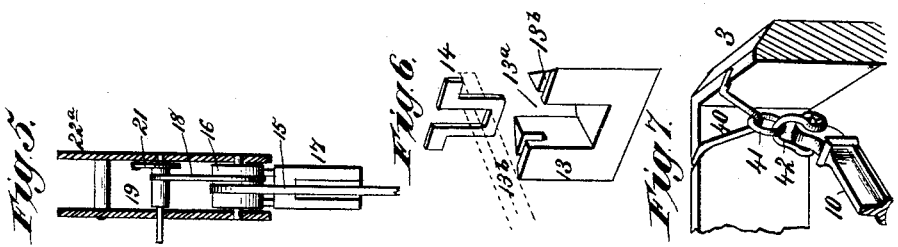
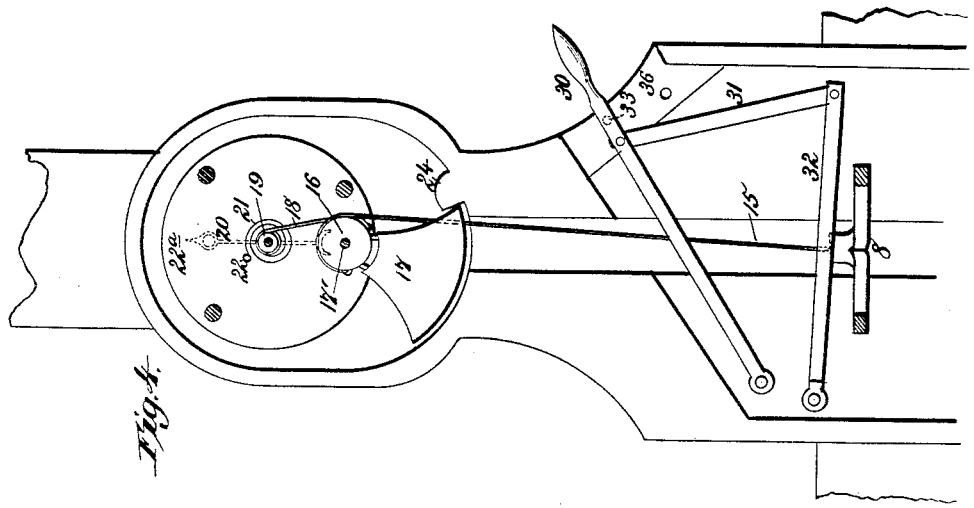
Witnesses. Inventor:
Robert Everitt. Isaac S. Sanger
J. A. Rutherford By James L. Norris
Atty.

UNITED STATES PATENT OFFICE.

ISAAC S. SANGER, OF WACO, TEXAS.

AUTOMATIC WEIGHING MECHANISM FOR ELEVATORS, &c.

SPECIFICATION forming part of Letters Patent No. 349,521, dated September 21, 1886.

Application filed June 10, 1886. Serial No. 204,763. (No model.)

*To all whom it may concern:*

Be it known that I, ISAAC S. SANGER, a citizen of the United States, residing at Waco, in the county of McLennan and State of Texas, have invented new and useful Improvements in Automatic Weighing Mechanism for Elevators, &c., of which the following is a specification.

The object of the present invention is to combine, with an ordinary elevator cage or platform, means for automatically indicating the amount of weight placed therein in the form of merchandise or passengers.

It is very desirable to remove the liability of overloading elevator-cages, such overloading leading to accidents by the breakage of the suspension devices, and hence I provide means which will, without the intervention of an attendant or operator, serve to indicate the exact weight placed on the elevator - cage. These means comprise a platform-scale and an automatic indicator mechanism, operated thereby to show the weight on a graduated dial.

The chief object of the invention is to prevent the overloading of the elevator-cage by showing when the maximum amount of weight is placed thereon, and thus guard against accidents; but, obviously, the invention is also useful for weighing goods of any weight below the maximum load which the elevator is adapted to hold. This is a great convenience in warehouses, as goods can be weighed without loss of time and without any additional handling.

The invention, briefly outlined in the foregoing statement, will be hereinafter fully described, and then set forth in the claims.

In the drawings, Figure 1 is a vertical section of an elevator-car having my automatic weighing mechanism applied thereto. Fig. 2 is a plan view of the lever mechanism of the weighing-platform. Fig. 3 is a front view of an elevator-car and its guideways. Fig. 4 is a view representing the internal mechanism of the automatic indicator operated by the platform-scale. Fig. 5 is another view of such automatic indicator. Figs. 6 and 7 show different forms for end supports of the levers of the platform-scale. Fig. 8 is a detail view of a bearing-block for the scale-platform.

The reference-numeral 1 indicates an elevator cage, car, or platform adapted for hoisting goods or passengers and moving in the customary manner on ways or guide-tracks 2. The bottom of this elevator-cage is made in the form of a box or casing, 3, which contains scale-beams; and a movable platform, 4, placed over said box-shaped elevator-bottom constitutes the floor proper of the elevator. The movable platform 4 is of the same size as the casing 3, and it bears on its under side metal blocks or brackets 5, which act upon the scale-beams, and serve to operate the same when the platform is depressed. The blocks or brackets 5 (four in number) are located at the corners of the platform 4, and their shape is such that they will fit the angles formed by the corners of the platform, and the vertical bead or molding $4^a$ surrounding such platform. This bead or molding is beveled, and it matches the beveled top edge of the casing 3, so that the platform and casing can be brought close together and the former rendered stationary, for the purpose hereinafter stated.

The lever mechanism inclosed in the casing 3 consists of the main lever 8, which has diverging arms extending to bearings or supports at the corners of one side of the box, while from said diverging arms the lever forms a straight body and is carried to the side of the casing bearing the indicator and balance mechanism, hereinafter set forth. Beneath the main lever 8 and co-operating therewith is arranged another lever, 10, which consists of two arms diverging from an apex-piece, 11, to supports at the corners of the casing opposite to the corners in which the main lever is supported. A stirrup, 12, has knife-edges $12^a$, which rest in notches in the upper surface of the lever 8, and it also has a bottom knife-edge, $12^b$, upon which the apex-piece 11 of the lever 10 is supported. This apex-piece has a notch in its under side for receiving the knife-edge $12^b$ of the stirrup 12.

The end supports for the levers have been mentioned as being located at the corners of the casing 3. They are all alike and consist of a block, 13, which is shaped to fit the corner of the casing, and has an open center, $13^a$, and grooves $13^b$ in the top, as is clearly shown in Fig. 6. These grooves are made angular or wider at the top than at the bottom, and receive a stirrup, 14, which is in all respects like the larger stirrup, 12, above referred to. The object of the various stirrups and supports is to allow the levers to have the necessary play required in all platform-scales.

It should be observed that one or both of the arms constituting the secondary lever 10 are provided with round ends or balls 10ᵃ, turning in corresponding sockets in the apex-piece 11. This is to give the necessary rocking or play as the lever is depressed by the platform.

The end of the lever 8 opposite its fulcrum is connected with a steel or other band, 15, which is carried in an upward direction, and is connected with a circular head or hub, 16, mounted on a horizontal arbor, 17', having its bearings in front and rear supports. The band 15 passes partly around the periphery of the hub 16, (see Fig. 4,) and is secured to a pin projecting therefrom. A weight, 17, of a segmental shape, is also carried by the hub 16, and projects normally in a downward direction from the latter. This weight is of a known or predetermined size necessary to produce a proper balance, and its function is the same as the spring of the ordinary spring-balance. A cord or chain, 18, connected with the hub carrying the balance-weight is also attached to a rotary shaft, 19, which is journaled at its ends and bears a pointer or finger, 20. This shaft 19 is encircled by a coiled spring, 21, the inner end of which is secured to the shaft, while its outer coil is secured to a fixed support, 22, within the inclosing-casing 22ᵃ. The latter may form an integral part of the elevator standard; but in practice I propose to make it separate from the standard, so that it can be attached to the latter and removed therefrom. The front of the casing 22 is formed by a graduated dial, 23, marked from zero up to any desired number which determines the capacity of the elevator or scale. The pointer 20 sweeps over the dial and serves to indicate the weight placed on the scale-platform or loose floor of the elevator.

Within the casing 22ᵃ is placed a stop-block, 24, which limits the rotation of the weight and serves to hold the greater portion of the latter at a point beyond the center or arbor of the hub 16. In other words, the weight, when in its normal position or state of rest, has the preponderance of its body at one side of the center of the hub 16, such an arrangement being required for the proper performance of weighing small bodies.

It is essential in handling heavy freight and other objects that the concussions and jars caused by dropping or throwing them on the platform should not be transmitted to the weighing or balance devices. I therefore provide means for throwing the lever devices beneath the platform out of action until such time as the objects on the platform require the use of the indicator and scale devices to determine the weight of such objects. The means for throwing the scale-levers in a downward direction, so as to allow the platform to rest firmly upon the casing 3, comprise the hand-lever 30, which is fulcrumed at one end to the elevator standard or other support, and is by a link, 31, connected with another end-pivoted lever or presser bar, 32, arranged above the lever 8 of the platform-scale mechanism. The lever 30 has a pin or lug, 33, which can be entered into holes at the top and bottom of a face or wear plate, 36, over which the lever moves. The latter is sufficiently movable on its fulcrum to slide inward toward the plate 36, and a spring-tongue, 37, (see Fig. 3,) bears upon the lever and holds its pin in either of the holes in which it is placed. When the scale is in operation, the lever 30 is in an elevated position, and the pin thereon is entered in the upper hole in the plate 36. By depressing the lever 30, the bar 32 presses upon the main lever of the scale mechanism, and consequently moves it and all the other levers away from the loose platform or elevator-floor. The latter is then free to drop, and it is firmly supported by the corner-pieces, 5, resting on the tops of the corner-pieces on the casing 3. The pieces 5, it should be mentioned, have each a downward projection, 5ᵃ, with a notched knife-edge, which rests upon the top of the levers.

In the modification shown in Fig. 7 the corner-supports of the levers are changed, there being used in this instance a stirrup, 40, which fits in notches in the casing 3, and bears a loose ring, 41, connected by a clevis, 42, with the end of the scale-lever.

The operation of the parts has been incidentally traced out in the description of the construction, and it is only necessary to add that when the platform is depressed by objects placed thereon the scale-levers will be rocked downward in their supports, and the hub bearing the segmental weight will be rotated by reason of the band-connection with the main scale-lever. The arbor bearing the pointer being connected with the hub by a cord, it is obvious that the winding of said cord upon the hub will rotate the arbor of the pointer and move the latter over the graduated dial. The position the pointer assumes on the dial indicates the load placed on the scale-platform, and to do this it is evident that the segmental weight must be so balanced and hung that it can swing in the space of a quarter of a circle within its inclosing-casing. Upon the removal of the weight from the scale-platform the coiled spring connected with the arbor of the pointer is brought into action for reversing the rotation of said arbor and returning it to the zero position, it being understood that the pointer makes a complete revolution while the weight moves in the space of a quarter of a circle. By rotating the pointer-arbor the cord which connects the same with the hub bearing the weight is unwound from such hub and wound up on the pointer-arbor. The parts are now in position for a renewal of the weighing operation already described.

I desire it to be understood that while I have shown my automatic weighing mechanism applied to an elevator, I can, without departing from the spirit of my invention, embody the same mechanism in stationary and portable platform-scales or weighing-machines in general.

I am aware that it is not new to combine weighing mechanism with an elevator cage or platform, so that the goods to be hoisted can be weighed either during the hoisting operation or while the goods are in suspension. Such an adaptation of an elevator for weighing purposes differs from my invention, since in the devices in view a scale-beam or steelyard mechanism with an adjustable weight is operated by hand in the manner of ordinary beam-scales. In my invention the prime object is to indicate automatically the precise weight placed upon the elevator-platform, so as to guard against the overloading thereof, and consequently remove the danger of accidents. In loading a warehouse-elevator the merchandise is generally thrown hurriedly upon the platform; and it is obvious that means must exist for quickly indicating the amount of the load. A scale-beam requiring the adjustment of the weight would be too slow a procedure for the purpose aimed at by me. Furthermore, it would require an attendant to make the adjustment, and frequently this cannot be done when the goods reach up to the scale-beam and render the same difficult of access. My automatic indicator mechanism, however, is placed in a proper position, so as to be never concealed by the load; and it shows at a glance what weight has been placed on the platform and what additional weight is required to make the maximum load.

Having thus described my invention, what I claim is—

1. The combination, with the elevator-car, the vertically-movable platform, the scale-beams arranged beneath said platform and the vertical frame of the elevator-car, of the automatic weight-indicating mechanism affixed to the vertical frame of the elevator-car above the vertically-movable platform, means for connecting the indicating mechanism with the scale-beams, and means for raising and lowering said scale-beams to cause the movable platform to bear thereupon or to rest solidly upon the elevator-car, substantially as set forth.

2. The combination of the pendulous weight 17, hub 16, arbor 17', flexible band 18, pointer 20, arbor 19, and coiled spring 21, with the holding plates or frame $22^a$, stop 24, the band 15, the scale-beams, and the movable platform, substantially as herein set forth.

3. In a weighing apparatus, the combination, with the casing or support, the movable platform, and scale-levers co-operating therewith, of a presser-bar and means for operating the same to disengage the scale-levers from the platform and cause the same to firmly rest on its casing or support, substantially as described.

4. The combination of the hand-lever having locking-pin, the connecting-link, the presser-bar, and the plate having holes, with the scale-levers, the platform, and the weight-indicating devices, substantially as described.

In testimony whereof I affix my signature in presence of two witnesses.

ISAAC S. SANGER.

Witnesses:
JAMES L. NORRIS,
JOS. L. COOMBS.